US008738520B2

(12) United States Patent
Runkle et al.

(10) Patent No.: US 8,738,520 B2
(45) Date of Patent: May 27, 2014

(54) SEND AND RECEIVE SIDE CONTROL OF MONEY TRANSFER PARAMETERS

(75) Inventors: Angela M. Runkle, Maple Grove, MN (US); Adam C. Gerety, Trophy Club, TX (US); Douglas D. Dalton, St. Michael, MN (US); Daniel H. Depolis, St. Michael, MN (US); Jacob W. Wagner, Carver, MN (US)

(73) Assignee: MoneyGram International, Inc., Dallas, TX (US)

( * ) Notice: Subject to any disclaimer, the term of this patent is extended or adjusted under 35 U.S.C. 154(b) by 0 days.

(21) Appl. No.: 13/453,347

(22) Filed: Apr. 23, 2012

(65) Prior Publication Data

US 2013/0282561 A1    Oct. 24, 2013

(51) Int. Cl.
  *G06Q 40/00*      (2012.01)
(52) U.S. Cl.
  USPC .......................................................... 705/39
(58) Field of Classification Search
  USPC .................................................... 705/35–45
  See application file for complete search history.

(56) References Cited

U.S. PATENT DOCUMENTS

| | | | |
|---|---|---|---|
| 5,326,960 | A | 7/1994 | Tannenbaum |
| 5,432,326 | A | 7/1995 | Noblett, Jr. et al. |
| 5,864,483 | A | 1/1999 | Brichta |
| 5,920,848 | A | 7/1999 | Schutzer et al. |
| 6,018,718 | A | 1/2000 | Walker et al. |
| 6,205,433 | B1 | 3/2001 | Boesch et al. |
| 6,292,786 | B1 | 9/2001 | Deaton et al. |
| 6,687,679 | B1 | 2/2004 | Van Luchene et al. |
| 6,915,271 | B1 | 7/2005 | Meyer et al. |
| 6,938,013 | B1 | 8/2005 | Gutierrez-Sheris |
| 7,050,983 | B2 | 5/2006 | Kawai |
| 7,213,744 | B2 | 5/2007 | Michelsen et al. |
| 7,258,268 | B2 | 8/2007 | Steiger, Jr. |
| 7,356,505 | B2 * | 4/2008 | March ............................ 705/39 |
| 7,568,615 | B2 | 8/2009 | Corona et al. |

(Continued)

FOREIGN PATENT DOCUMENTS

| | | | |
|---|---|---|---|
| EP | 1866861 A2 | | 12/2007 |
| WO | WO2009052365 | * | 4/2009 |
| WO | WO2009052365 A1 | | 4/2009 |

OTHER PUBLICATIONS

Banorte Selects Moneygram for US Transfers—Mexico, Apr. 17, 2002, Business News Americas—Latin America's Business Information Leader, 1 page.

(Continued)

*Primary Examiner* — Richard C Weisberger
(74) *Attorney, Agent, or Firm* — Faegre Baker Daniels LLP

(57) ABSTRACT

A computer system in a money transfer transaction. A request is received from a sender on a send computer to send a money transfer having a send amount. The sender is prompted on the send computer to select one or more parameters associated with the money transfer, the one or more parameters comprising money transfer receiver information including a receiver location. Money transfer fees associated with the money transfer are analyzed for a plurality of receive locations proximate the receiver location based on the selected one or more parameters. A receive location offering a lowest money transfer fee is selected from the plurality of receive locations. The send amount and fee for the selected receive location are collected from the sender. Information related to the money transfer is then stored, including the selected one or more parameters and the receive location, in a money transfer server.

9 Claims, 3 Drawing Sheets

(56) References Cited

U.S. PATENT DOCUMENTS

| | | |
|---|---|---|
| 7,742,942 B2 | 6/2010 | Nicholson |
| 7,761,344 B2 | 7/2010 | Smith |
| 7,761,367 B1 | 7/2010 | Scalora et al. |
| 7,810,067 B2 | 10/2010 | Kaelicke et al. |
| 7,925,513 B2 | 4/2011 | Chao et al. |
| 8,019,679 B2 | 9/2011 | Bennett et al. |
| 8,082,210 B2 * | 12/2011 | Hansen et al. .......... 705/39 |
| 2002/0002505 A1 | 1/2002 | Kojima |
| 2002/0091603 A1 | 7/2002 | Steiger et al. |
| 2002/0111908 A1 | 8/2002 | Milberger et al. |
| 2002/0143566 A1 | 10/2002 | Diveley |
| 2002/0152177 A1 | 10/2002 | Wolf |
| 2003/0182228 A1 | 9/2003 | Wolf |
| 2003/0208384 A1 | 11/2003 | Nelson et al. |
| 2004/0030647 A1 | 2/2004 | Hansen et al. |
| 2004/0167815 A1 | 8/2004 | DeLaHunt |
| 2004/0172358 A1 | 9/2004 | Lent et al. |
| 2004/0199462 A1 | 10/2004 | Starrs |
| 2006/0253321 A1 | 11/2006 | Heywood |
| 2006/0261150 A1 | 11/2006 | Seifert et al. |
| 2007/0033112 A1 | 2/2007 | Nagle, Jr. |
| 2007/0088610 A1 | 4/2007 | Chen |
| 2007/0203821 A1 | 8/2007 | DuFour |
| 2008/0140568 A1 | 6/2008 | Henry |
| 2008/0147506 A1 | 6/2008 | Ling |
| 2008/0154719 A1 | 6/2008 | Gounares et al. |
| 2008/0249908 A1 | 10/2008 | Lorberg et al. |
| 2009/0063261 A1 | 3/2009 | Scribner et al. |
| 2009/0063331 A1 | 3/2009 | Rodin |
| 2009/0106149 A1 | 4/2009 | Bennett et al. |
| 2009/0157520 A1 | 6/2009 | Algiene et al. |
| 2010/0100426 A1 | 4/2010 | Sander et al. |
| 2010/0100477 A1 | 4/2010 | Giammanco |
| 2010/0114774 A1 | 5/2010 | Linaman et al. |
| 2010/0299761 A1 | 11/2010 | Shapiro |
| 2011/0137796 A1 | 6/2011 | Tullis |
| 2011/0282790 A1 | 11/2011 | Bennett et al. |
| 2012/0010993 A1 | 1/2012 | Ferrara et al. |
| 2012/0030098 A1 | 2/2012 | Bulawa et al. |
| 2012/0303524 A1 | 11/2012 | Bertram et al. |
| 2013/0073457 A1 | 3/2013 | Sander et al. |
| 2013/0179334 A1 | 7/2013 | Nardone et al. |

OTHER PUBLICATIONS

Information on MoneyGram.com 2003-2006, archived web pages printed from www.archive.org, date is in the URL in YYYYMMDD format.

MoneyGram Adds 1,500 Bancomer Locations in Mexico, Apr. 17, 2001, 2 pages.

MoneyGram Corporate—How to transfer money, MoneyGram. International, webpages from http://www.moneygram.com/MGICorp/ConsumerProducts . . . , 5 Pages; May 30, 2007.

Press release from Norkom Technologies, "Wall Street's Back Office Launches Market-Leading AML software from Norkom," Feb. 15, 2007, 2 pp., http://www.norkom.com.

* cited by examiner

SEND AND RECEIVE SIDE CONTROL OF MONEY TRANSFER PARAMETERS

TECHNICAL FIELD

The present invention relates to computer systems for money transfers. More particularly, the present invention relates to systems and methods for providing money transfer senders and receivers the ability to control and modify parameters associated with the money transfer.

BACKGROUND

A number of businesses offer money transfer and other services through a network of agents. A customer that desires to use these services to transfer money to a third party can take the money to an agent of the money transfer service. The agent accepts the money, obtains necessary information such as the customer's identity and the identity of the receiver, and initiates a transaction. The money transfer options or parameters that are selectable by the sender are limited to the amount of the money transfer, the location of receipt of the money transfer, and the recipient of the money transfer.

After processing, the money transfer is then made available to the receiver at another location operated by the money transfer service. The receiver can retrieve at the money transfer by going to the location and providing personal information and money transfer confirmation number to the receiving agent at the receive location. When the information provided by the recipient has been verified, the receiving agent then distributes the money to the receiver based on the money transfer amount. However, the parameters of the money transfer are set by the sender, and the receiver has limited ability to modify the money transfer parameters to meet personal requirements and conveniences.

SUMMARY

In one aspect, the present disclosure relates to a method for operating a computer system in a money transfer transaction. A request is received from a sender on a send computer to send a money transfer having a send amount. The sender is prompted on the send computer to select one or more parameters associated with the money transfer, the one or more parameters comprising money transfer receiver information including a receiver location. Money transfer fees associated with the money transfer are analyzed for a plurality of receive locations proximate the receiver location based on the selected one or more parameters. A receive location offering a lowest money transfer fee is selected from the plurality of receive locations. The send amount and fee for the selected receive location are collected from the sender. Information related to the money transfer is then stored, including the selected one or more parameters and the receive location, in a money transfer server.

In another aspect, the present disclosure relates to a system for generating and processing a money transfer transaction. A send computer is configured to receive a request from a sender to send a money transfer having a send amount. The send computer is also configured to prompt the sender on the send computer to select one or more parameters associated with the money transfer, the one or more parameters comprising money transfer receiver information including a receiver location. The send computer is configured to analyze money transfer fees associated with the money transfer for a plurality of receive locations proximate the receiver location based on the selected one or more parameters. The send computer is further configured to select a receive location from the plurality of receive locations offering a lowest money transfer fee. The system further includes a money transfer server including a memory configured to store information related to the money transfer including the selected one or more parameters in a money transfer server.

In a further aspect, the present disclosure relates to a method for operating a computer system in a money transfer transaction. Information related to a money transfer transaction including a send amount and one or more selectable parameters is generated by a sender on a send computer at a first location and stored. The money transfer transaction is processed at a second location remote from the first location. Particularly, the sender is prompted on the send computer to select one or more parameters associated with the money transfer, the one or more parameters comprising money transfer receiver information including a receiver location. Money transfer fees associated with the money transfer are then analyzed for a plurality of receive locations proximate the receiver location based on the selected one or more parameters. A receive location offering a lowest money transfer fee is selected from the plurality of receive locations. The send amount and fee for the selected receive location are collected from the sender. Funds are then released to the receiver in the send amount in accordance with the selected or modified one or more parameters.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
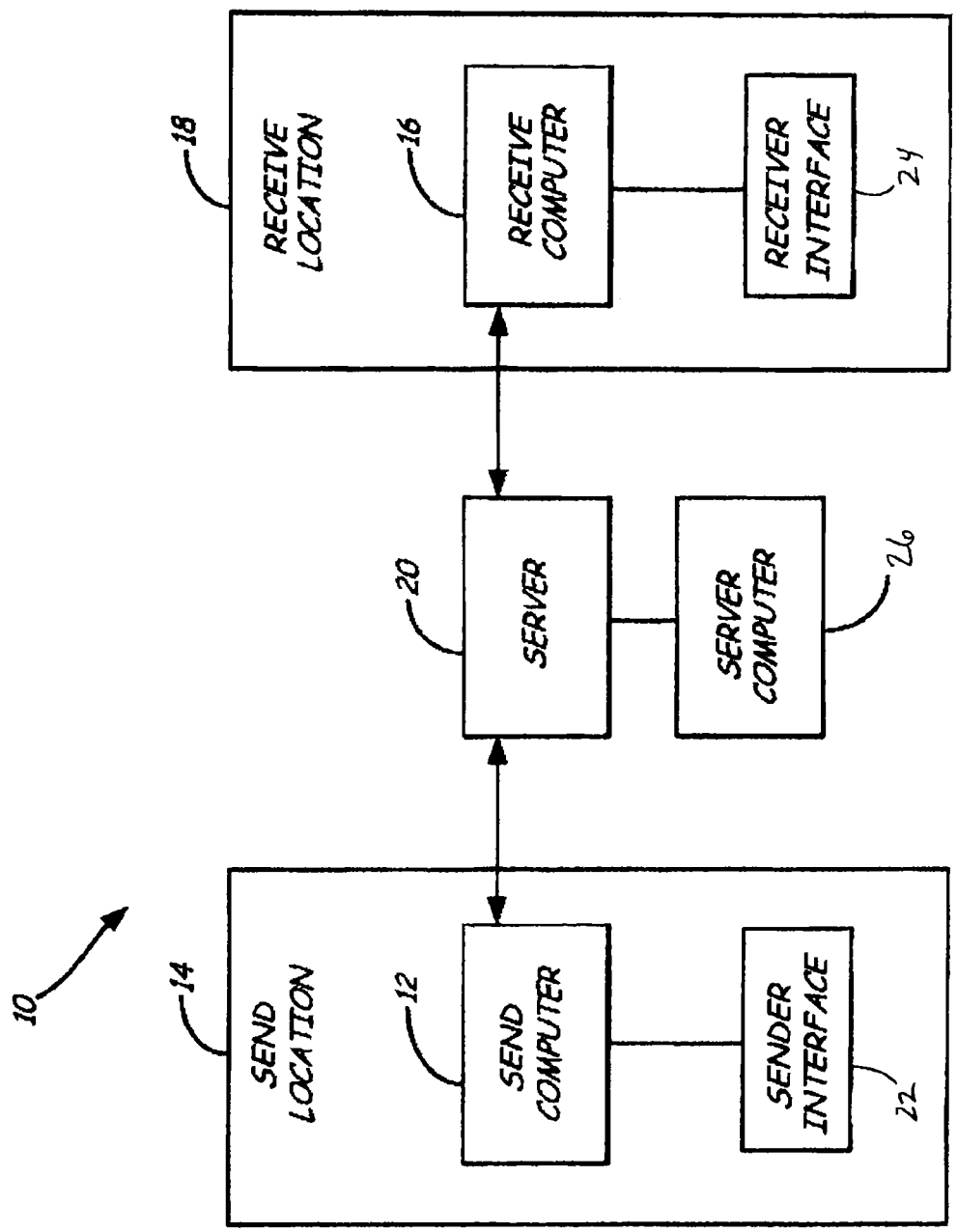
FIG. 1 is a block diagram of an embodiment of a system that allows control and modification of money transfer parameters by the money transfer sender and/or receiver.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a block diagram of an embodiment of a system 10 for sending and receiving money transfers. System 10 includes a send computer 12 at a send location 14 and a receive computer 16 at a receive location 18. The send computer 12 and the receive computer 16 communicate with a central server 20, for example via a communication network such as the internet. In some embodiments, a sender interface 22 is connected to the send computer 12, and a receiver interface 24 is connected to the receive computer 16. The system 10 facilitates the sending of money transfers through the send computer 12, and the receipt of the money transfer through the receive computer 16.

The send location 14 may be a facility that is approved by a financial services organization to send purchase requests for money transfers to the server 20. The send location 14 may be a store or dedicated location that provides redemption services for money transfers. Alternatively, the send location 14 may access a computer remotely, such as via a telephone call or the internet. The send computer 12 is operated by an agent at the approved send location 14. The send computer 12 may include software that facilitates entry of information to request sending the money transfer for subsequent transmission to the server 20 for approval. The agent at the send location 14 may also review purchaser identification and accept funds from the sender of the money transfer. In some embodiments, the agent accepts funds on behalf of the financial services organization. The send location 14 may also include a telephone (not shown) or other voice communications device to contact the financial services organization if questions arise during the money transfer request process. While a single send location 14 is shown in FIG. 1, in actual implementation, the system 10 includes a plurality of send locations 14 that each includes a send computer 12 that communicates with the server 20.

In alternative embodiments, the send computer 12 may be any computer configured to provide information to the server 20 via a secure internet or server connection. For example, the send computer 12 may be a home computer, kiosk, or other interactive device. The send computer 12 may include a web browser or other application that provides a user interface to enter information to send a money transfer. The web browser may allow for entry of sender identification information and sender account information, the latter of which authorizes withdrawal of funds from an account with a financial institution to fund the money transfer. As another example, the send computer 12 may be configured to receive money transfer send information from the sender via telephone or interactive voice recognition systems. As a further example, a telephone at the send location 14 may be used to contact a call center (not shown) to initiate a send request to the server 20. The send computer 12 may also be located remotely from the send location 14.

The receive location 18 may be an institution that is approved by the financial services organization to receive money transfers for the benefit of a receiver associated with the institution and issue funds to the money transfer receivers. As discussed above, the receive location 18 may be institutions such as a correctional facility, custodial care facility, a court, or a school. The receive computer 16 at the receive location 18 may be operated by an approved employee of the institution using the receiver interface 24. The receive computer 18 may include software that facilitates retrieval of information about money transfers sent to the institution for the benefit of receivers associated with the institution. The employee operating the receive computer 16 at the receive location 18 may also, in some cases, review the information associated with the money transfer, such as the amount and purpose of the money transfer funds. If approved, the employee issues funds to the money transfer receiver's account at the institution. The receive location 18 may also include a telephone or other voice communications device to contact the financial services organization if questions arise during the money transfer receipt process. The receive computer 16 may alternatively be located remotely from the receive location 18. While a single receive location 18 is shown in FIG. 1, in actual implementation, the system 10 includes a plurality of receive locations 18 that each includes a receive computer 16 that communicates with the server 20.

The server 20 may be housed and/or operated by or on behalf of the financial services organization that, among other functions, approves and coordinates send transactions of money transfers at the send location 14 and receive transactions of money transfers at the receive location 18. The server 20 facilitates approval of send requests from the send location 14 and receive requests from the receive location 18. In some embodiments, the server 20 is configured to process send and receive requests automatically. In other embodiments, the server 20 provides information to a user at the financial services organization for review and approval. For example, the server 20 may be connected to a computer 26 that provides an interface to a user at the financial services organization to review and approve or deny money transfer send or receive transactions. In some embodiments, the server 20 provides compliance functions for money transfer transaction. The server 20 includes storage capabilities to store information from money transfer send transactions for later retrieval during the money transfer receive approval process. In addition, the server 20 may store other information such as, for example, past customer money transfer send/receive activity, customer account information, and computer identification and log-in information for the send computer 12 and receive computer 16.

As will be described in more detail herein, the system 10 facilitates customization of money transfer transactions by allowing the money transfer sender and/or receiver to select or modify parameters associated with the money transfer. The ability of the sender and/or receiver to select or modify parameters allows for processing of a money transfer that is tailored to the specific needs and conveniences of the sender and/or receiver. In addition, the financial services organization can use the customization feature to give the sender or receiver multiple pricing options for a money transfer transaction provide discounted fees for using identified or promoted services.

Figure 2:
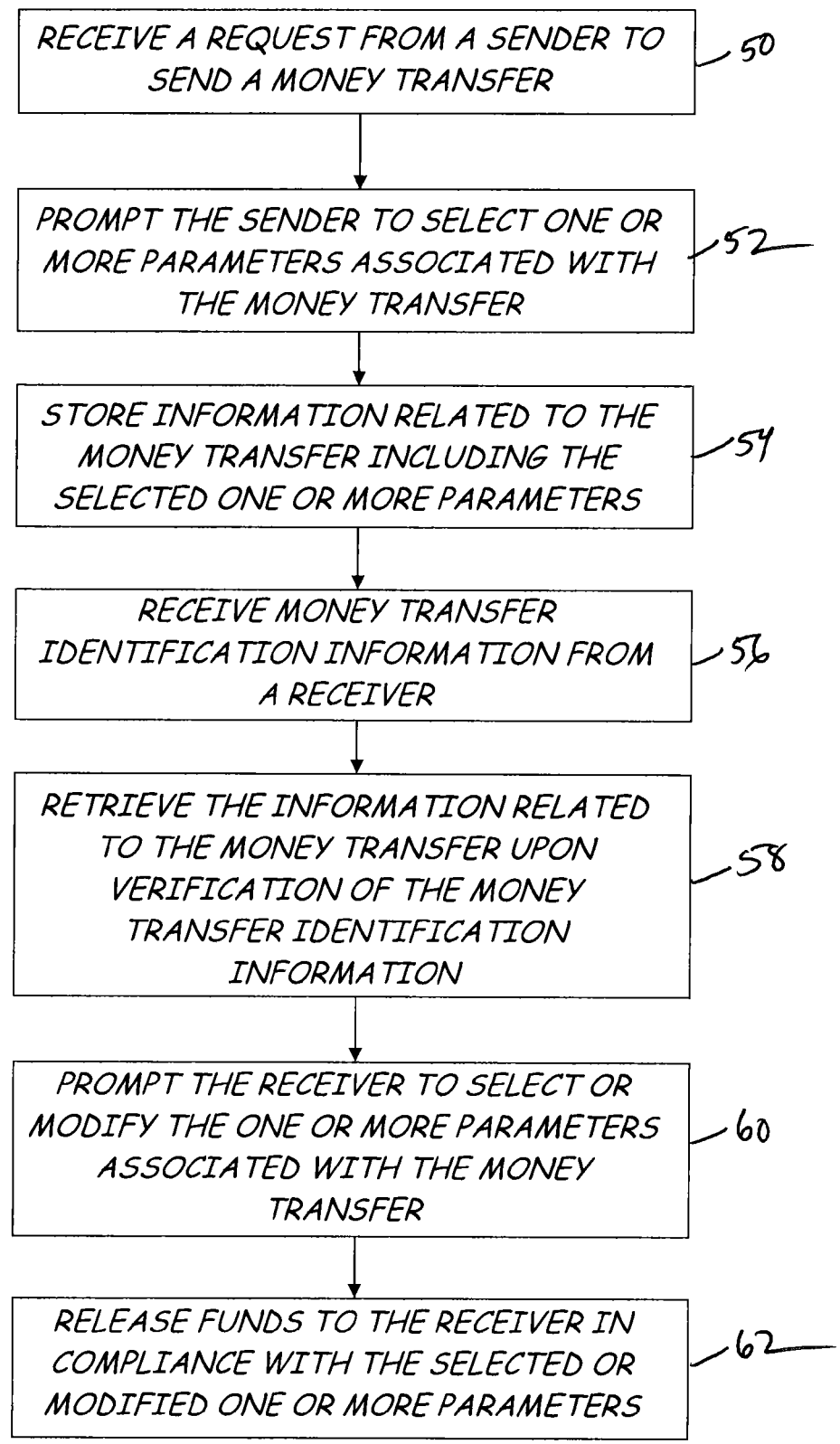
FIG. 2 is a flow diagram of an embodiment of providing money transfer senders and receivers the ability to control and modify parameters associated with the money transfer.

FIG. 2 is a flow diagram of an embodiment of providing money transfer senders and receivers the ability to control and modify parameters associated with the money transfer. In step 50, the financial services organization receives a request from a money transfer sender to send a money transfer. For example, the sender may enter a send location 14 and work with an agent at the send location 14 to set up a money transfer. To set up the transaction, the sender may provide information to the agent such as the sender's identification, the money transaction receiver's identification, the amount of the money transfer, and the location and channel through which the receiver can retrieve the money transfer. The agent may enter the information on the send computer 12. Alternatively, the sender may provide the information on the send computer 12 via the sender interface 22.

After setting up the money transfer, in step 52, the sender is prompted via the send computer 12 to select one or more parameters associated with the money transfer transaction. The selectable parameters may include, for example, the channel of initiation or completion of the money transfer, service type, send or receive location, price, foreign exchange rates, and/or commission. The selectable parameters may also include delivery options including information about how the money transfer is distributed upon redemption (e.g., cash, account, debit card, bill pay, etc.). The selectable parameters may be presented to the sender, for example, based on the sender's preferences or needs or based on services, agents, or products that that the financial services organization wishes to promote.

For example, in some embodiments, the server 20 maintains a database of user profiles, including information about past money transfer transactions and preferences. When a sender prepares a money transfer on the send computer 12, the send computer 12 may access the sender's user profile and suggest money transfer parameters (e.g., receiver, receive location, etc.) for selection based on the sender's money transfer history. This allows the sender to quickly select parameters for the money transfer, particularly if the sender frequently send money transfers to particular parties or receive locations.

As another example, the sender may indicate to the send computer 12 or agent that the sender wishes to send a money transfer at a minimum cost. The send computer 12 may then determine whether certain parameters can be selected to reduce the fee (including, for example, price, foreign exchange rate, and commission) associated with the money transfer. The send computer 12 may, for example, provide a list of alternative receive locations, delivery options (e.g., cash, card, financial institution accounts, etc.), and service types (e.g., speed of delivery, currency, etc.) that have varying fees associated with them to allow the sender to select the combination of parameters that meets the sender's cost sensitivities and preferences for the money transfer transaction.

In some embodiments, the send computer 12 is configured to use the receiver information provided by the sender on the send computer 12 to determine receive location(s) near the receiver that require the lowest fee to send the money transfer. For example, the send computer 12 may contact the server 20 after the sender provides the receiver's location information (e.g., home address, city, etc.). The server 20 then analyzes stored information relating to the fees (e.g., price, foreign exchange rate, commission) for locations in the vicinity of the receiver's location. In some embodiments, the server 20 is programmed with a distance range from the receiver location within which to search (e.g., 20 miles). In other embodiments, the sender is prompted on the send computer 12 to provide the distance range within which to search. The server 20 may then provide to the send computer 12 the fee associated with sending the money transfer for all locations within the distance range. In some embodiments, the locations are listed on the send computer 12 in order of fee amounts (e.g., lowest fee to highest fee). The sender may then be prompted to select the desired receive location. In alternative embodiments, the receive location may be automatically selected for the sender based on the lowest fee available to send the money transfer within the distance range. In some embodiments, when the receive location is selected, the receiver is required to receive the money transfer at the location selected by the sender (or automatically selected). That is, the receiver may be prevented from opting for a different receive location and receiving or paying the difference in associated fees. In alternative embodiments, the receiver may have the option to select a different receive location and pay or receive the difference in fees from the fees paid by the sender.

As a further example, the financial services organization may promote products, services, or agents by providing reduced fees for selecting parameters associated with the promoted products, services, or agents. For example, the send computer 12 may be configured to promote a particular product or service by providing the sender with an option to select the promoted product or service after the sender has selected a similar product or service that is not being promoted. As another example, the send computer 12 may be configured to promote a particular receive location or agent by providing the sender an option to select a promoted location or agent after selecting a location or agent that is not being promoted. The list of promoted agents or locations may be limited to those that are geographically proximate to the originally selected agent or location.

In some embodiments, the sender can also limit the parameters that may be selected or modified after the money transfer is sent. For example, the sender may prevent the receiver from selecting or modifying parameters that will change the method of delivery, receive location, or the way the funds are distributed upon redemption. As another example, the sender may prevent or limit the ability to modify or select parameters after the money transfer is sent, but before the receiver has redeemed the money transfer.

When the sender has selected the one or more parameters as desired, the send computer 12 may calculate fees associated with the selected parameters. The sender may then pay the amount to be sent with the money transfer and the calculated fees to complete the send transaction. Information related to the money transfer, including the send amount and the selected parameters, are then sent to the server 20.

In alternative embodiments, steps 50 and 52 are performed on a send computer 12 remote from the send location 14. In these embodiments, the sender may use any computer or device configured to provide information to the server 20 via a secure internet or server connection. For example, the send computer 12 may be a home computer, kiosk, smart phone, point of sale, or other interactive device. The send computer 12 may use various means to communicate with the server 20, including a mobile device application, email, mail, text messages, or voice/telephone interaction. The send computer 12 may include a web browser or other application that provides a user interface to enter information to send a money transfer. The web browser may allow for entry of sender identification information and sender account information, the latter of which authorizes withdrawal of funds from an account with a financial institution to fund the money transfer. The sender may alternatively send the money transfer using a telephone, interacting with a live agent or with an interactive voice recognition system.

After setting up the transaction remotely from the send location 14, the user may enter a send location 14 to complete the money transfer send transaction by paying the send amount and any fees associated with the money transfer. When the sender is at the send location 14, the agent (or send computer 12) may provide the sender with the option to select or modify the parameters associated with the money transfer. For example, if the sender can send the money transfer with reduced fees by modifying certain selected parameters (e.g., receive location, method of delivery), the agent or send computer 12 may provide the sender with the option to update the selected parameters to reduce the fees associated with sending the money transfer. After the sender selects the preferred parameters, the fees associated with the transaction are calculated, and the sender pays the send amount and fees to complete the transaction.

In some embodiments, after sending the money transfer transaction, the sender receives a reference number or other money transfer identifying information. The sender may then provide the reference number to the receiver for redeeming the money transfer at the receive location 18. Alternatively, the sender may provide receiver contact information (e.g., telephone number, email address, mailing address, etc.) when setting up the money transfer, which may be used be the financial services organization to provide the reference number to the receiver directly (e.g., via the server 20 or server computer 26).

In step 56, the server 20 receives the information associated with the money transfer, including the sender and receiver identification information, the send amount, and the parameters selected by the sender. In some embodiments, the server 20 stores the money transfer information in a systemic state in which the parameters associated with the money transfer can be altered prior to the time of receive. For example, the sender may alter the delivery options, receive location, service type, and so on by accessing the money transfer transaction via the send computer 12. The money transfer information including the modified parameters is then stored in the server 20.

In step 58, the receiver provides identification information for the money transfer on the receive computer 16, located at a receive location 18 or remotely from the receive location 18, to initiate the receive transaction. For example, in embodiments in which the receiver is provided a confirmation number, the receiver may enter the confirmation number on the receive computer 16. The receiver may also be prompted to provide other information about the money transfer, including receiver identification information. The receive computer 16 communicates with the server 20 to verify the provided money transfer identification information. Upon verification, the receive computer 16 retrieves the money transfer information from the server 20.

In step 60, the receiver is then prompted on the receive computer 16 to select or modify the one or more parameters associated with the money transfer. The parameters selectable or modifiable by the receiver may include the same parameters presented to the sender for selection, or may include additional parameters that are specific to the receiver. For example, the receiver may have the option to modify the delivery option, service type, and/or the location or channel of the transaction previously selected by the sender. The receiver may select or modify the parameters on receive computer 16 at the receive location 18 at the time of redemption of the money transfer.

The receiver may also select or modify the parameters via a receive computer 16 located remotely from the receive location 18 prior to completing the money transfer transaction at the receive location 18. The receive computer 16 may be any computer or device configured to provide information to the server 20 via a secure internet or server connection. For example, the receive computer 16 may be a home computer, kiosk, smart phone, point of sale, or other interactive device. The receive computer 16 may use various means to communicate with the server 20, including a mobile device application, email, mail, text messages, or voice/telephone interaction.

In one exemplary use, the receiver may use the receive computer 16 to divide the money transfer into multiple transactions such that the sent amount is distributed among a plurality of recipients. For example, the receiver may opt to divide the money transfer into portions distributed to different financial institution accounts, to bill pay recipients, to other individuals, to charities, to receiver, and so on. In some embodiments, the sender may have the option to limit or prevent modification of the money transfer recipients, and the receive computer 16 would limit the receiver's ability to modify this parameter accordingly.

When the receiver has selected or modified the money transfer parameters to the receiver's preferences, then, in step 62, the funds may be released to the receiver at the receive location 18 in compliance with the selected or modified money transfer parameters. For example, if the sender or receiver has opted to release the funds to the receiver in the form of a debit card, the receive location 18 provides the receiver with debit card with the send amount loaded onto it. As another example, if the sender or receiver has identified multiple recipients for the money transfer, the receive location 18 and/or server 20 distributes the send amount in accordance with the selected delivery parameters.

Figure 3:
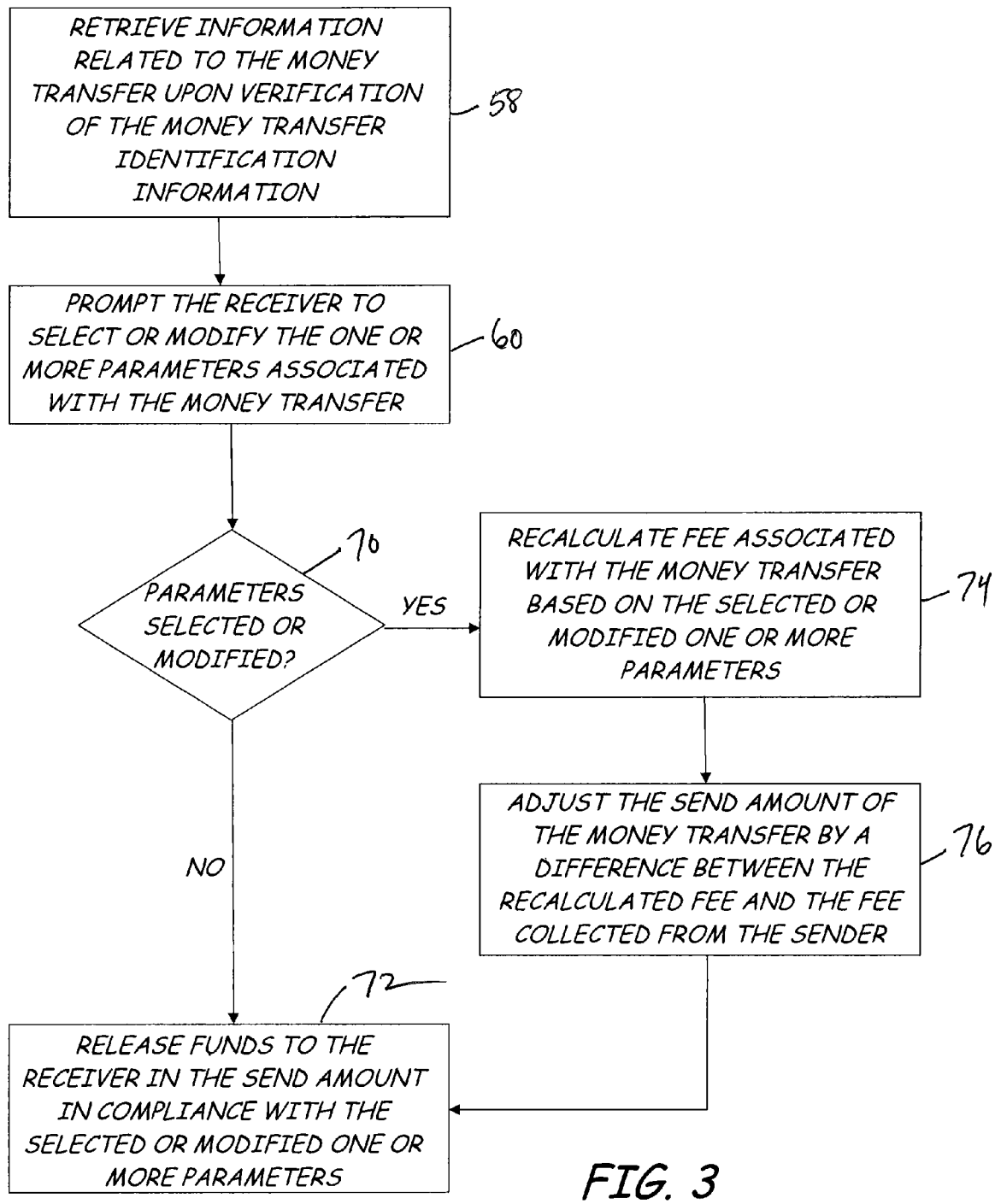
FIG. 3 is a flow diagram of an embodiment of providing money transfer senders and receivers the ability to control and modify parameters associated with the money transfer and calculating an updated fee based on selected or modified parameters.

In some cases, the parameters selected or modified by the receiver can result in a change in the fees due for the money transfer transaction. For example, the parameters selected may result in a reduction or increase in the price of the transaction, the commission due, and/or the foreign exchange fee for the transaction. FIG. 3 is a flow diagram of an variation on the method described with regard to FIG. 2, taking into account the possibility of a change in fees due for a transaction.

Steps 58 and 60 in FIG. 3 are substantially the same as steps 58 and 60 described above in FIG. 2. In this embodiment, rather than releasing the funds after the receiver selects or modifies the money transfer parameters, the server 20 and/or receive computer 16 determines whether the receiver has selected or modified any parameters that may affect the fees for the money transfer transaction (decision step 70). If the server 20 and/or receive computer 16 determine that the selected or modified parameters do not affect the fees for the money transfer transaction (or if no parameters are selected or modified by the receiver), then, in step 72, the system 10 releases funds to the receiver in compliance with the money transfer parameters (similar to step 62 discussed above).

If, in decision step 70, the server 20 and/or receive computer 16 determine that the parameters selected or modified by the receiver change the fees due for the money transfer transaction, then, in step 74, the receive computer 16 recalculates the fee associated with the money transfer based on the parameters as updated by the receiver. For example, if the receiver modifies the speed at which the money transfer is available to make the money transfer available sooner, the fee for the transaction may increase. As another example, if the receiver updates the parameters to select a promoted product, service, agent, or location, the money transfer fees may decrease.

In step 76, the amount sent in the money transfer is adjusted by a difference between the recalculated fee and the fee collected from the sender. For example, if the parameters selected or modified by the receiver results in a decrease in the fees due for the money transfer, the difference between the fee collected from the sender and the recalculated fee is added to the send amount in the money transfer. As another example, if the parameters selected or modified by the receiver results in an increase in the fees due for the money transfer, the additional fees are deducted from the sent amount. Alternatively, the system 10 may be configured contact the sender, either automatically or in response to a request by the receiver, to pay the difference in fees due for the transaction.

When the send amount has been adjusted pursuant to the increase or decrease in fees, then, in step 72, the funds may be released to the receiver at the receive location 18 in compliance with the selected or modified money transfer parameters (similar to step 62 discussed above).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A method for operating a computer system in a money transfer transaction, the method comprising:
   receiving a request from a sender on a send computer to send a money transfer having a send amount;

prompting the sender on the send computer to select one or more parameters associated with the money transfer, each of the one or more parameters comprising receiver information concerning the money transfer, the one or more parameters including a receiver location;

analyzing money transfer fees associated with the money transfer for a plurality of receive locations proximate the receiver location based on the selected one or more parameters;

selecting a receive location from the plurality of receive locations offering a lowest money transfer fee;

collecting the send amount and a fee for the selected receive location from the sender; and storing information related to the money transfer including the selected one or more parameters and the receive location in a money transfer server.

2. The method of claim 1, wherein the fee is calculated as a function of the receive location selected.

3. The method of claim 1, wherein the step of prompting the sender to select the one or more parameters comprises:
allowing the sender to set the one or more parameters that are selectable or modifiable by the receiver.

4. The method of claim 1, wherein the collecting step is performed at a send location, and wherein the send computer is remote from the send location.

5. The method of claim 1, and further comprising:
receiving money transfer identification information from the receiver on a receive computer, wherein the information related to the money transfer is retrieved from the money transfer server by the receive computer upon verification of the money transfer identification information;
prompting the receiver on the receive computer to select or modify the one or more parameters associated with the money transfer; and
releasing funds to the receiver in the send amount in accordance with the selected or modified one or more parameters.

6. The method of claim 5, wherein, after the receiver is prompted to select or modify the one or more parameters, the method further comprises:
recalculating the fee associated with the money transfer based on the one or more parameters selected or modified by the receiver; and
adjusting the send amount of the money transfer by a difference between the recalculated fee and the fee collected from the sender.

7. The method of claim 6, wherein the adjusting step comprises adding the difference between the recalculated fee and the fee collected from the sender to the send amount.

8. The method of claim 5, wherein the releasing step is performed at a receive location, and wherein the receive computer is remote from the receive location.

9. The method of claim 5, wherein prompting the receiver to select or modify the one or more parameters comprises:
allowing the receiver to split the money transfer into multiple transactions such that the send amount is distributed to a plurality of recipients.

* * * * *